(12) United States Patent
Maupin et al.

(10) Patent No.: US 10,905,149 B2
(45) Date of Patent: Feb. 2, 2021

(54) ROTARY DRUM BLANCHER WITH SKINSHEET CLAMP

(71) Applicant: Lyco Manufacturing Inc., Columbus, WI (US)

(72) Inventors: Daniel D. Maupin, Corvallis, OR (US); Steven J. Schultz, Beaver Dam, WI (US); William D. Zittel, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 776 days.

(21) Appl. No.: 15/403,701

(22) Filed: Jan. 11, 2017

(65) Prior Publication Data

US 2017/0196252 A1  Jul. 13, 2017

Related U.S. Application Data

(60) Provisional application No. 62/277,428, filed on Jan. 11, 2016, provisional application No. 62/276,945, filed on Oct. 10, 2016.

(51) Int. Cl.
*A23N 12/04* (2006.01)
*A23L 3/18* (2006.01)
*A23L 5/10* (2016.01)
*A23B 7/06* (2006.01)

(52) U.S. Cl.
CPC .............. *A23N 12/04* (2013.01); *A23B 7/06* (2013.01); *A23L 3/18* (2013.01); *A23L 3/185* (2013.01); *A23L 5/10* (2016.08); *A23L 5/13* (2016.08); *A23V 2002/00* (2013.01)

(58) Field of Classification Search
CPC ... A23L 3/185; A23L 5/13; A23L 5/10; A23L 3/18; A23B 7/06; A23N 12/04; A23V 2002/00
USPC ........................................................... 99/348
See application file for complete search history.

(56) References Cited

U.S. PATENT DOCUMENTS

| | | | | |
|---|---|---|---|---|
| 3,268,336 A | * | 8/1966 | Hale | A23L 3/185 425/113 |
| 4,033,142 A | * | 7/1977 | Schorsch | B02C 19/186 241/23 |
| 4,492,505 A | * | 1/1985 | Dunning | B62B 5/00 414/454 |

(Continued)

*Primary Examiner* — Eric S Stapleton
(74) *Attorney, Agent, or Firm* — George R. Corrigan

(57) ABSTRACT

A method and apparatus for changing all or part of the skinsheet of a rotary drum blancher/cooler from being clean in place totally removable is disclosed. The drum includes the skinsheet (in sections) with a plurality of clamps and catches. Each catch is comprised of two catches—a clean in place catch and a totally removable catch. Each clamp is attached to a section and has an clamping position and a release position, and includes a bail. When a clamp is in the clamping position and its bail is in either the clean in place catch or the totally removable catch of a corresponding catch on an adjacent second section, the catch and clamp hold the adjacent sections together to form a part of the drum. When the clamp is in the release position and the bail is in the clean in place catch of the adjacent section, the clamp and clean in place catch allow adjacent sections to separate, but do not allow them to be removed.

18 Claims, 5 Drawing Sheets

(56) References Cited

U.S. PATENT DOCUMENTS

| | | | | |
|---|---|---|---|---|
| 5,098,140 | A * | 3/1992 | Kentner | E06B 11/021 292/205 |
| 5,119,720 | A * | 6/1992 | Rodriguez | A23L 3/364 134/142 |
| 5,193,444 | A * | 3/1993 | Bar-Sheshet | A21B 1/26 126/21 A |
| 5,329,842 | A * | 7/1994 | Zittel | A23B 7/0053 134/132 |
| 5,518,264 | A * | 5/1996 | Broughton | A43B 5/0492 280/615 |
| 5,669,288 | A * | 9/1997 | Zittel | A23N 12/04 134/132 |
| 5,692,569 | A * | 12/1997 | Constantino | A01L 3/00 168/17 |
| 6,095,035 | A * | 8/2000 | Zittel | A23B 7/158 134/132 |
| 6,105,485 | A * | 8/2000 | Zittel | A23B 7/06 134/132 |
| 6,186,340 | B1 * | 2/2001 | Hirs | B01D 29/15 210/411 |
| 6,189,439 | B1 * | 2/2001 | Weinstein | A23P 30/20 285/27 |
| 6,205,913 | B1 * | 3/2001 | Zittel | A23B 7/06 134/132 |
| 6,263,785 | B1 * | 7/2001 | Zittel | A23B 7/06 134/132 |
| 6,419,094 | B1 * | 7/2002 | Zittel | B01D 33/11 210/393 |
| 7,168,846 | B1 * | 1/2007 | Maupin | A23N 12/02 366/226 |
| RE40,232 | E * | 4/2008 | Zittel | A23B 7/06 426/509 |
| 7,500,426 | B2 * | 3/2009 | Zittel | A23L 3/185 134/132 |
| 7,735,415 | B2 * | 6/2010 | Zittel | A23B 7/06 99/348 |
| RE42,732 | E * | 9/2011 | Zittel | A23B 7/06 99/348 |
| 8,671,719 | B2 * | 3/2014 | Chang | D06F 37/04 68/140 |
| 8,739,691 | B2 * | 6/2014 | Zittel | A23B 7/06 99/348 |
| 8,800,435 | B2 * | 8/2014 | Maupin | A23B 4/26 99/348 |
| 8,930,031 | B2 * | 1/2015 | Wong | D06F 35/007 700/279 |
| 9,452,899 | B2 * | 9/2016 | Stousland | A23L 3/185 |
| 2005/0132759 | A1 * | 6/2005 | Guinibert | D06F 58/04 68/24 |
| 2007/0044666 | A1 * | 3/2007 | Zittel | A23B 7/06 99/348 |
| 2012/0011891 | A1 * | 1/2012 | Chang | D06F 37/04 68/12.26 |
| 2013/0074703 | A1 * | 3/2013 | Maupin | A23B 7/06 99/404 |
| 2014/0033446 | A1 * | 2/2014 | Vander Zwaag | D06F 37/28 8/137 |
| 2014/0208704 | A1 * | 7/2014 | Hill | B01D 46/2411 55/483 |
| 2014/0245630 | A1 * | 9/2014 | McCarthy | D06F 37/28 34/487 |

* cited by examiner

US 10,905,149 B2

ROTARY DRUM BLANCHER WITH SKINSHEET CLAMP

FIELD OF THE INVENTION

The present disclosure relates generally to the art of rotary drum blancher/coolers. More specifically, it relates to rotary drum blancher/coolers with skinsheets attached thereto.

BACKGROUND OF THE INVENTION

Rotary drum blanchers are well known for gently handling food product. One example of a rotary drum blancher is found in U.S. Pat. No. 5,669,288, which is hereby incorporated by reference. Other rotary drum blanchers may be found in U.S. Pat. No. 9,452,899, entitled Transfer mechanism for use with a food processing system; U.S. Pat. No. 8,800,435, entitled Rotary screw blancher with fluid passage and fluid agitation; U.S. Pat. No. 8,739,691, entitled Rotary screw blancher; RE42,732, entitled Rotary blancher for processing food product; U.S. Pat. No. 5,329,842, entitled Combination blancher and cooler; U.S. Pat. No. 6,095,035, entitled Dual drum food processor; U.S. Pat. No. 6,105,485, entitled Pressurized rotary blancher; U.S. Pat. No. 6,263,785, entitled Blancher and method of operation; U.S. Pat. No. 7,500,426, entitled Rotary cooker and cooler with improved product transfer mechanism; RE40,232, entitled Method for processing food product; U.S. Pat. No. 7,168,846, entitled Rotary processing device; U.S. Pat. No. 6,419,094, entitled Fixed sequential sprayer for a cylindrical wastewater screen; and U.S. Pat. No. 6,205,913, entitled Rotary drum blancher for cooking food include, each of which are also hereby incorporated by reference.

Rotary blanchers generally include skinsheets which define the rotary drum in which blanching occurs. Many prior art rotary blanchers have bolted-on skinsheets which create a very tight strong cylinder, but have overlapping areas that are difficult to clean. Skinsheet, as used herein, refers to the skin forming the drum. The skinsheet has sections that collectively define the drum, but each individually defines only part of the drum. Sections typically extend circumferentially—for example six sections might each extend slightly more than 30 degrees each, so that with overlapping they extend the entire circumference (360 degrees).

Totally removable skinsheets have been developed, which give full cleaning access, but can be cumbersome to remove, store, clean, and install exactly in the same location. The skinsheet sections are unbolted and each section removed.

The owner of this invention, LYCO Manufacturing, developed CIP (clean in place) skinsheets which opens up overlapping sections by separating sections, but the sections are not removed. These skinsheets were an improvement over other prior art skinsheets, because they were easier to clean.

The design of totally removable skinsheets (and how it is attached to the drum) is very different from the design of CIP skinsheets (and how it is attached to the drum). Thus, a rotary drum blancher was designed and sold with either a totally removable skinsheet or a CIP skinsheet, and could not readily be converted from one to the other.

However, a user might desire to change from a totally removable skinsheet to a CIP skinsheet, or visa-versa depending on that users particular needs. Accordingly, a rotary drum that can be used with both totally removable skinsheets and CIP skinsheets, is desired, particularly one that can be changed easily from one to the other.

SUMMARY OF THE PRESENT INVENTION

According to a first aspect of the disclosure a rotary drum blancher/cooler for processing food includes a drum having a skinsheet with a plurality of clamps and catches. The skinsheet defines the drum and is made up of sections, with each section extending part of the circumference. Each catch is comprised of two catches—a clean in place catch and a totally removable catch. Each clamp is attached to a section and has an clamping position and a release position, and includes a bail. When a clamp is in the clamping position and its bail is in either the clean in place catch or the totally removable catch of a corresponding catch on an adjacent second section, the catch and clamp hold the adjacent sections together to form a part of the drum. When the clamp is in the release position and the bail is in the clean in place catch of the adjacent section, the clamp and clean in place catch allow adjacent sections to separate, but do not allow them to be removed.

According to a second aspect of the disclosure a method of changing a skinsheet on a rotary drum blancher/cooler for processing food from a clean in place skinsheet to a totally removable skinsheet, or visa versa, includes adjusting a bail from a clean in place length to a totally removable length (or visa versa). The bail is mated with a clean in place or totally removable catch depending on the lengths of the bail. The clamp in then moved into the clamping position.

The bail is mated with the clean in place catch by placing a part of a u shaped bail in a U-shaped catch, and the bail is mated with the totally removable catch by placing a part of the u shaped bail under a tab in various embodiments.

The bail of each clamp is a U-shaped bail and is adjustable in length in one alternative.

The catches include a U-shaped portion that defines the clean in place catch in another alternative.

The catches include a tab that defines the totally removable catch in one embodiment.

The clean in place catch and the totally removable catch that form a catch are part of the single fixture, or each a distinct fixture in various embodiments.

The catches and/or clamps are welded to the sections in various embodiments and the catches and/or clamps are not welded to the sections in other embodiments.

All of the sections have clamps and catches in one embodiment, and less than all of the sections have clamps and catches in another embodiment.

Some of the clamps are in the clamping position with the bail disposed in the clean in place catch, and others of the clamps are in the clamping position with the bail disposed in the totally removable catch in another alternative.

Other principal features and advantages of will become apparent to those skilled in the art upon review of the following drawings, the detailed description and the appended claims.

Figure 1:
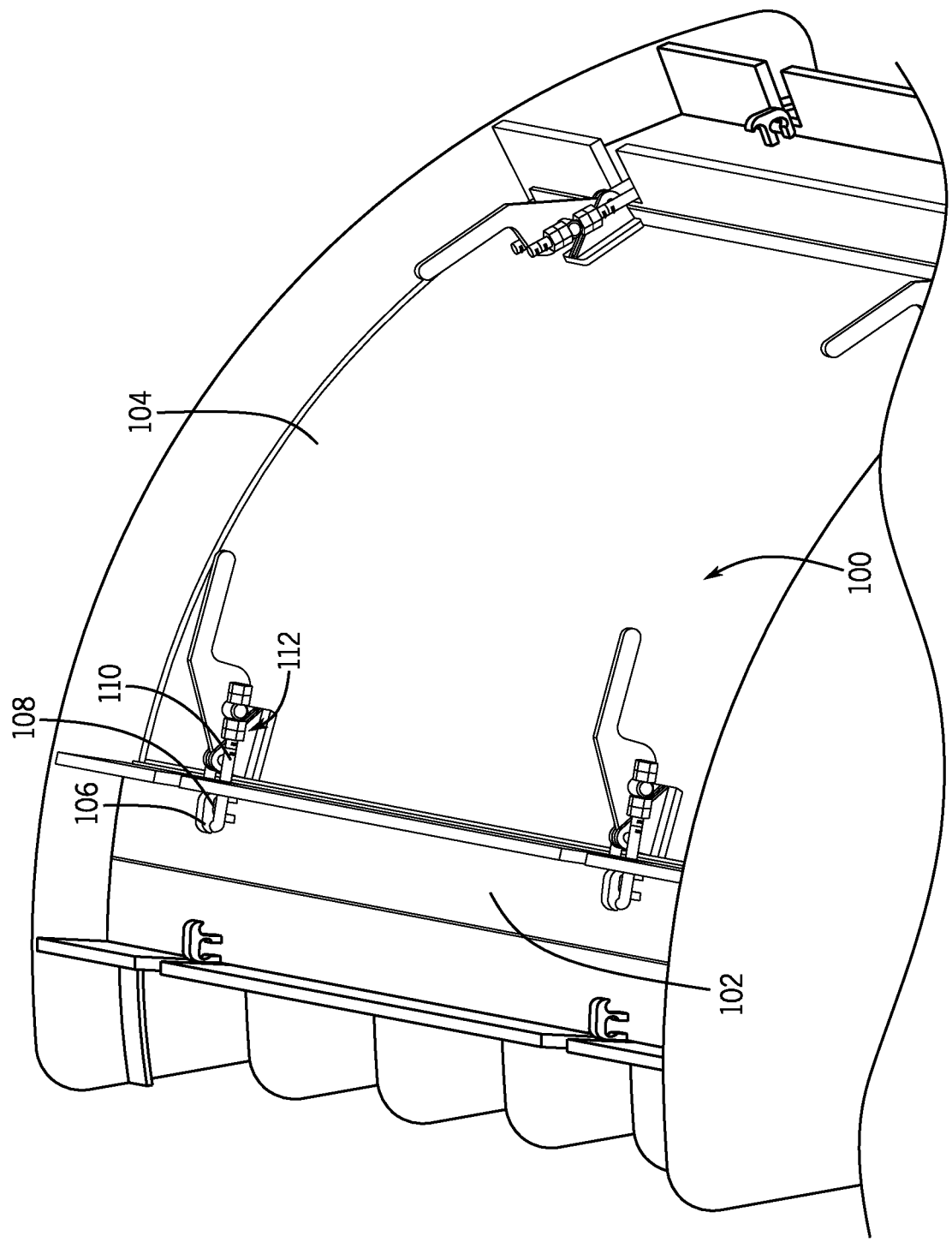
FIG. 1 is portion of a drum with a clamp in a clamping position in a totally removable catch.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular clamp and catch, it should be understood at the outset that other clamps and catches can be used to implement the invention, and that the clamps and catches can be used in other environments. The invention can be used with any rotary drum blancher/cooler.

Figure 5:
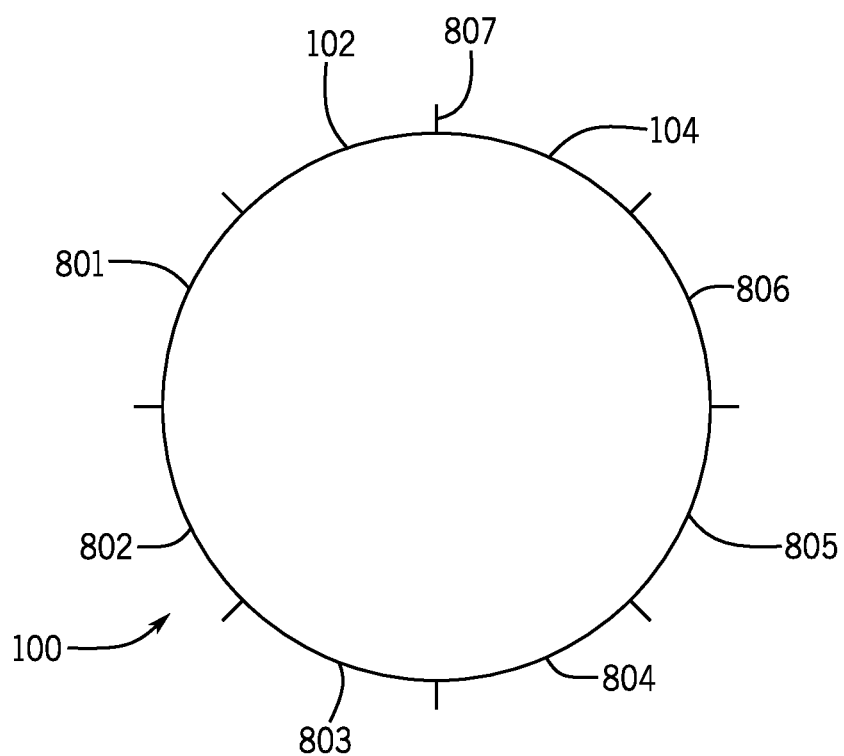
FIG. 5 is a cross section of a drum skinsheet.

This disclosure describes a clamp that can be used to hold a skinsheet to from the drum of a blancher/cooler. Blancher/cooler, as used herein, refers to a device to blanch and/or cool product. Multiple sections (2, 3 4, 6, 8 or more in various embodiments) of the skinsheet for the drum. Collectively the sections extend the entire circumference (in the circumferential direction) of the drum. Individually each section extends less than the entire circumference of the drum. FIG. 5 shows a cross section of a drum 100 comprised of eight sections 102, 104 and 801-806. Flanges 807 are at the edge of each section. Collectively the skinsheet sections form the entire drum. The skinsheet sections collectively extend the entire length in the circumferential direction to form the circumference, but each of section individually extends less than the entire circumference in the circumferential direction to form only a portion of the circumference. The sections are shown in FIG. 8 as each being 22.5 degrees (⅛ of the circumference, although different sections can be of different sizes, and a different number of sections may be used.

Depending on how the clamp is used, in the release position the skinsheet can be a clean in place skinsheet, or a totally removable skinsheet, or partially both. When some clamps are in the clean in place position, and others in the totally removable position the skinsheet is partially a totally removable skinsheet and partially a clean in place skinsheet—some sections are be left in place for cleaning, while others removed. Also, some sections can be held in place using traditional methods.

The preferred embodiment uses a typical over-center clamp with a U-shaped bail to tighten the skinsheet. However, the catch is unlike that of the prior at. The catch is comprised of two catches.

One catch is a totally removable catch—the bail (preferably as U-bolt) clamps on the outside of the catch in the clamping (operable) position (when securing the skinsheet) and lifts over the catch in the traditional manner when opened (the release position) to totally remove the skinsheet. Totally removable catch, as used herein, refers to a catch for a clamp that allows the skinsheet to be totally removed when the clamp is opened. Clamping position, for a clamp, as used herein, refers to a position where the clamp holds adjacent sections (or other objects being clamped) together. Release position, for a clamp, as used herein, refers to a position where the clamp does not hold adjacent sections (or other objects being clamped) together.

The catch also has a clean in place catch where the bail is installed in a closed feature that allows the clamp to be adjusted in a manner that will tighten the clamp properly in the clamping position, but when the clamp is in the release position the skinsheet will remain with the cylinder for cleaning. The sections are separated but not able to be removed when they are in the clean in place position. In the clean in place position the bail goes through catch. Clean in place catch, as used herein, refers to a catch for clamp that allows the skinsheet to be cleaned in place when the clamp is opened.

The customer or original manufacturer can configure and reconfigure the skinsheet to either a CIP mode or a totally removable mode by selecting which position is used. If necessary, the length of the bail is adjusted based on which catch is used. One embodiment provides that the catch is designed to be welded permanently in place, and the clamp body is also attached permanently (such as by welding) to the skinsheet. Another embodiment provides that the clamp body is not permanently to the skinsheet. The totally removable catch and the clean in place catch are part of a single fixture in one embodiment. The totally removable catch and the clean in place catch are part of distinct fixtures in another embodiment. Single fixture for two catches, as used herein, refers to two catches that have at least some common structure. Distinct fixtures for two catches, as used herein, refers to two catches that do not have at least some common structure.

The disclosure includes a method of changing a skinsheet on a rotary drum blancher/cooler for processing food from a clean in place skinsheet to a totally removable skinsheet, or visa versa. The method includes adjusting the bail from a clean in place length to a totally removable length (or visa versa). The bail is mated with the clean in place or totally removable catch depending on the lengths of the bail. The clamp in then moved into the clamping position.

Turning now to FIG. 1, a part of a drum 100, including a section 102 and a section 104 is shown. A clamp 112 cooperates with a catch 106, including a totally removable catch 106 (also called tab 106) to hold sections 102 and 104 together because clamp 112 is in the operable (clamping) position. A bail 110 goes under tab (or clean in place catch) 106 to hold clamp 112 in the clamping position.

Figure 4:
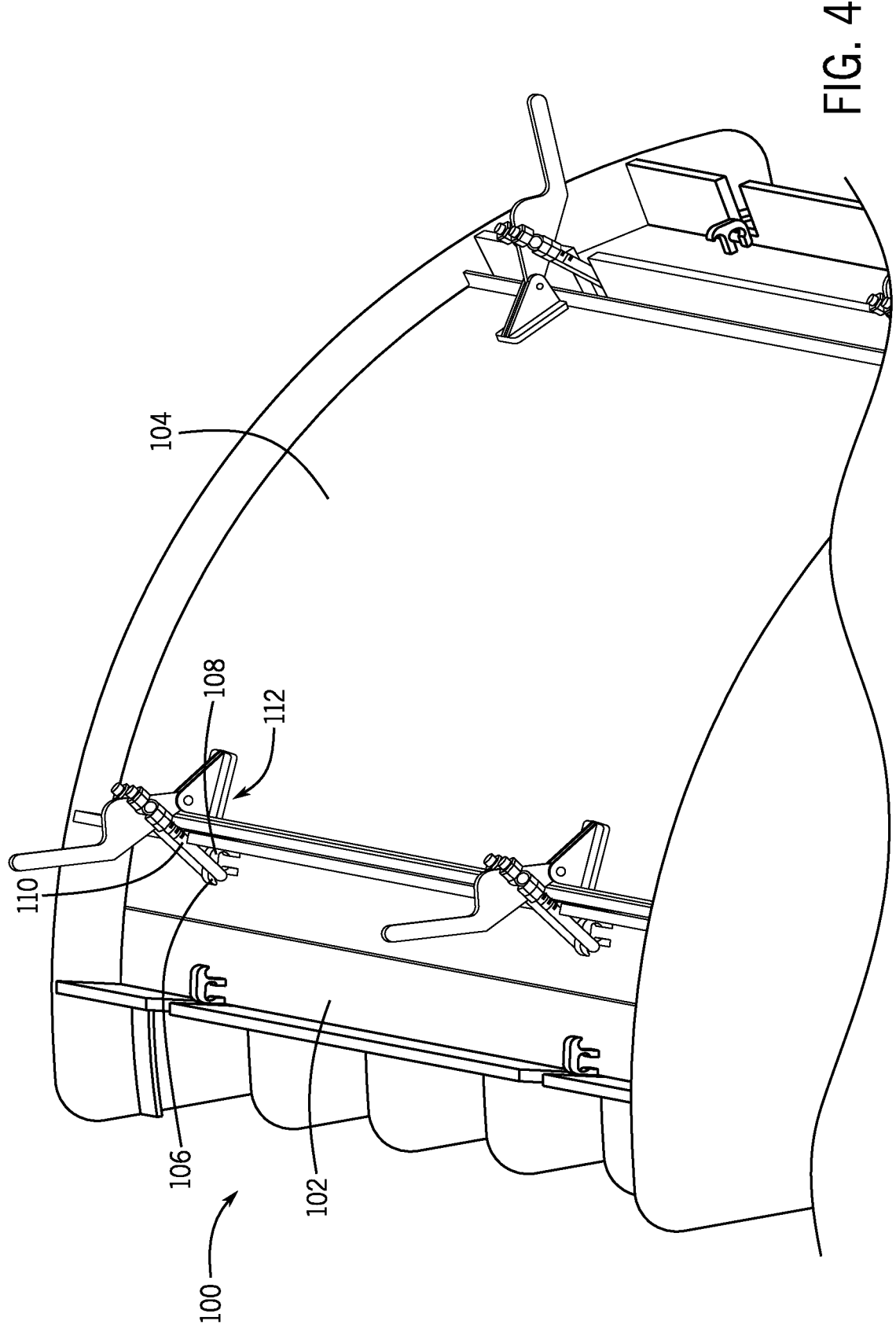
FIG. 4 is portion of a drum with the clamp in the release in a totally removable catch.

FIG. 4, shows drum 100 with clamp 112 in the open or release position. Bail 110 is still shown under tab 106. To totally remove sections 102 and 104, bail 110 is moved over tab 106, and the sections are completely free of one another (assuming any other clamps are also operated in this manner).

Figure 2:
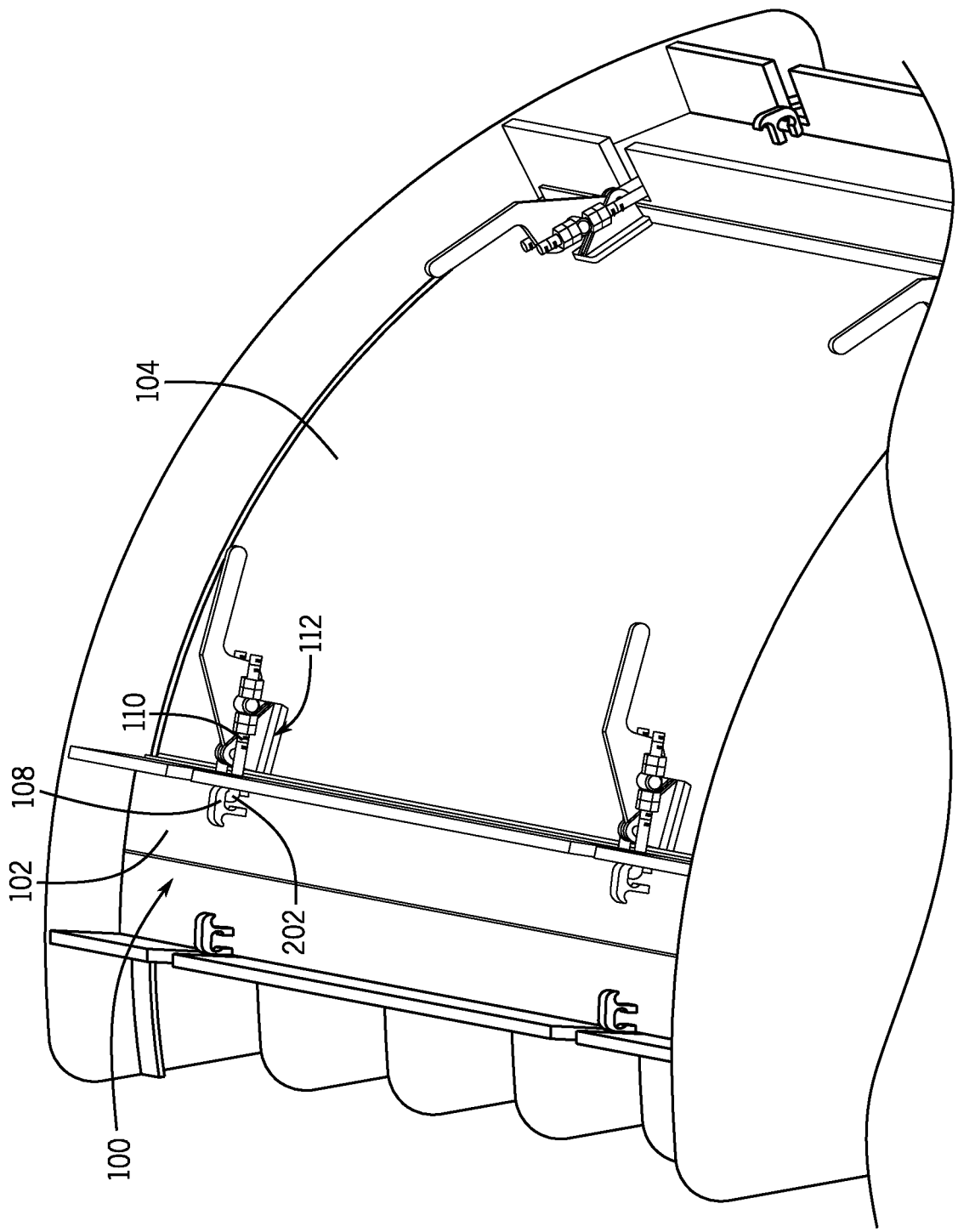
FIG. 2 is portion of a drum with the clamp in a clamping position in a clean in place catch.

Turning now to FIG. 2, clamp 112 is in the clamping position and bail 110 is under and through a clean in place catch 202 (which is part of catch 108). When in this position bail 110 might need to be shortened to provide the proper tension to hold sections 102 and 104 in place. Catch 106 is a single fixture, but can be two distinct fixture by simple separating the tab/totally removable catch 108 from clean in place catch 202.

Figure 3:
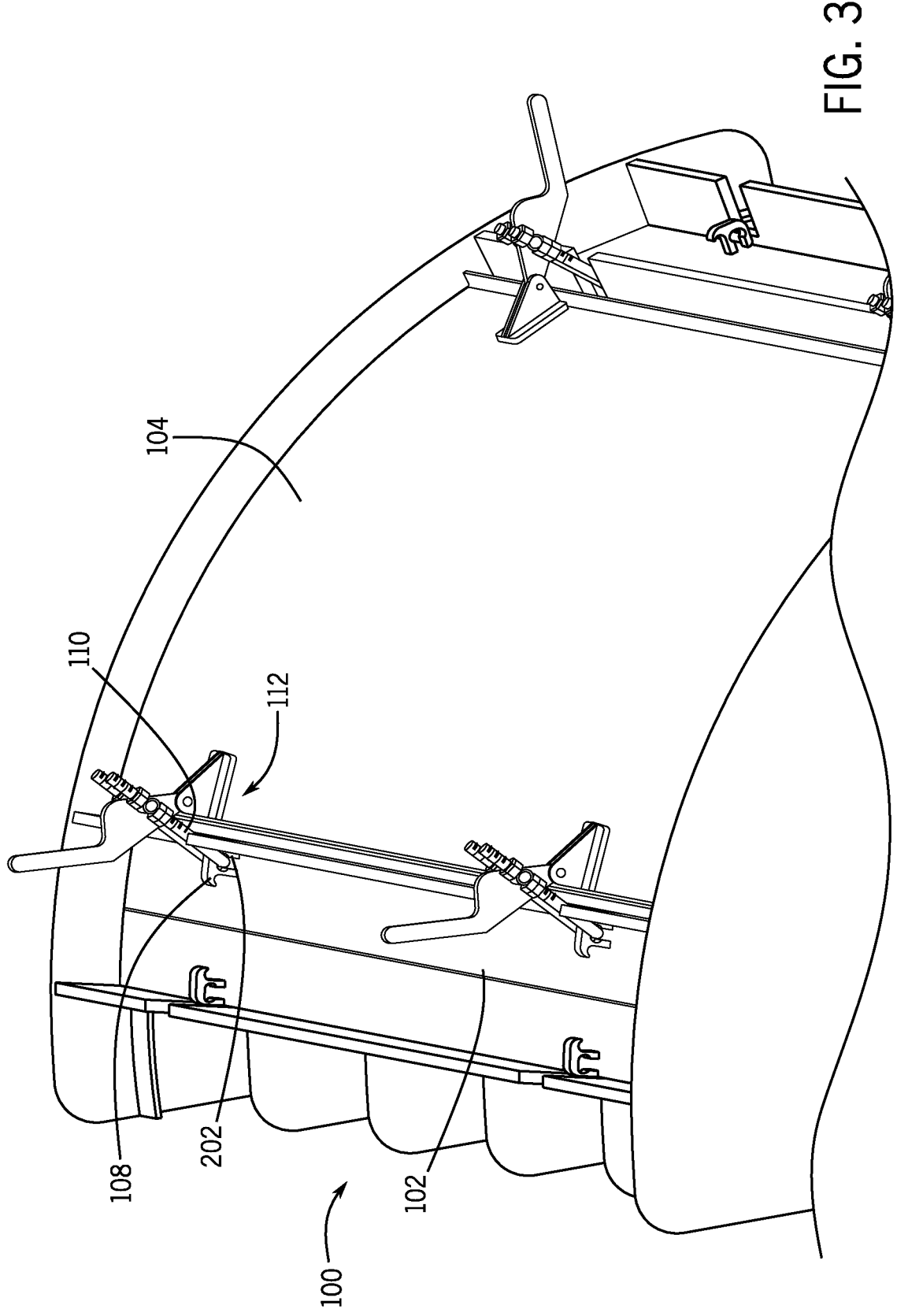
FIG. 3 is portion of a drum with a clamp in a release position in the clean in place catch.

FIG. 3, shows clamp 112 in the open or release position. Bail 110 is still through clean in place catch 202. This allows sections 102 and 104 to be separated, but prevents them from being totally removed. They can be cleaned in this position.

The bail (or U-bolt of the clamp) can be assembled in either the CIP mode or the totally removable mode by simple disassembly of the clamp. Switching modes is accomplished by unscrewing the bail and threading it through the catch and then reinstalling the bail.

Alternatives provide for using the clamp and catches to clamp other devices, and one embodiment is simply the clamp and catch, and another just the catch.

Numerous modifications may be made to the present disclosure which still fall within the intended scope hereof. Thus, it should be apparent that there has been provided a method and apparatus for a blancher/cooler that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A rotary drum blancher/cooler for processing food, comprising a drum, wherein the drum comprises:
a skinsheet;
a plurality of clamps; and
a plurality of catches;
wherein the skinsheet defines the drum, wherein a circumference of the drum is a given length in a circumferential direction, wherein the skinsheet includes a plurality of sections that collectively extend the given length in the circumferential direction to form the circumference, and wherein each of the plurality of sections individually extends less than the given length in the circumferential direction to form a portion of the circumference; and
wherein each of the plurality of catches is attached to a one of the plurality of sections, and wherein each of the plurality of catches includes a first clean in place catch and a second totally removable catch;
wherein each of the plurality of clamps is attached to a respective one of the plurality of sections, wherein each of the plurality of clamps has an clamping position and a release position and includes a bail;
wherein when a corresponding clamp attached to a first section is in the clamping position and the bail of the corresponding clamp is disposed in the clean in place catch of a corresponding catch attached to an adjacent second section, the corresponding clamp cooperates with the corresponding clean in place catch to hold the first section to the second adjacent section together to form a part of the drum;
wherein when the corresponding clamp attached to the first section is in the clamping position and the bail of the corresponding clamp is disposed in the totally removable catch of the corresponding catch attached to the adjacent second section, the corresponding clamp cooperates with the corresponding totally removable catch to hold the first section to the second adjacent section together to form the part of the drum; and
wherein when the corresponding clamp attached to the first section is in the release position and the bail of the corresponding clamp is disposed in the clean in place catch of the corresponding catch attached to the adjacent second section, the corresponding clamp cooperates with the corresponding clean in place catch to allow the first section and the second adjacent section to separate but do not allow the first section and the second adjacent section to be removed.

2. The rotary drum blancher/cooler of claim 1, wherein the bail of each of the plurality of clamps is a U-shaped bail that is adjustable in length.

3. The rotary drum blancher/cooler of claim 2, wherein each of the plurality of catches includes a U-shaped portion that defines the clean in place catch.

4. The rotary drum blancher/cooler of claim 2, wherein each of the plurality of catches includes a tab that defines the totally removable catch.

5. The rotary drum blancher/cooler of claim 2, wherein the corresponding catch is welded to the corresponding adjacent second section.

6. The rotary drum blancher/cooler of claim 5, wherein the corresponding clamp is welded to the corresponding first section.

7. The rotary drum blancher/cooler of claim 5, wherein the corresponding clamp is not welded to the corresponding first section.

8. The rotary drum blancher/cooler of claim 1, wherein at least a first number of each of the plurality of catches are comprised of a single fixture and the clean in place catch and the totally removable catch are part of the single fixture.

9. The rotary drum blancher/cooler of claim 1, wherein at least a first number of each of the plurality of catches are comprised of a first fixture that is the clean in place catch and further comprised of a second fixture that is the totally removable catch, and wherein the first fixture is distinct from the second fixture.

10. The rotary drum blancher/cooler of claim 1, wherein each of the plurality of sections has at least one of the plurality of clamps attached thereto, and wherein each of the plurality of sections has at least one of the plurality of catches attached thereto.

11. The rotary drum blancher/cooler of claim 1, wherein at least one of the plurality of sections does not have one of the plurality of clamps and one of the plurality of catches attached thereto.

12. The rotary drum blancher/cooler of claim 1, wherein at least a first subset of the plurality of clamps are in the clamping position with the bail disposed in a mating clean in place catch and wherein at least a second first subset of the plurality of clamps are in the clamping position with the bail disposed in a mating totally removable catch.

13. A rotary drum blancher/cooler for processing food, comprising a drum, wherein the drum comprises:
a skinsheet;
wherein the skinsheet defines the drum, wherein a circumference of the drum is a given length in a circumferential direction, wherein the skinsheet includes a plurality of sections that collectively extend the given length in the circumferential direction to form the circumference, and wherein each of the plurality of sections individually extends less than the given length in the circumferential direction to form a portion of the circumference; and
means for clamping at least a subset of the plurality of sections together such that adjacent sections of the plurality of sections are hold together to form the drum, and for releasing the subset of the plurality of sections in a selected one of a totally removable release and a clean in place release.

14. The rotary drum blancher/cooler of claim 13, wherein the means for clamping includes a U-shaped bail that is adjustable in length.

15. The rotary drum blancher/cooler of claim 14, wherein the means for clamping includes a U-shaped catch portion that defines a clean in place catch and a tab that defines a totally removable catch.

16. The rotary drum blancher/cooler of claim 15, wherein the clean in place catch and the totally removable catch are part of a single fixture.

17. The rotary drum blancher/cooler of claim 16, wherein the clean in place catch is a first fixture and the totally removable catch is a second fixture, and the first fixture is distinct from the second fixture.

18. The rotary drum blancher/cooler of claim 15, wherein the totally removable catch and the clean in place catch are welded to the plurality of sections.

\* \* \* \* \*